US012337232B2

(12) United States Patent
Mosier et al.

(10) Patent No.: US 12,337,232 B2
(45) Date of Patent: Jun. 24, 2025

(54) SYSTEMS AND METHODS FOR STREAMING INTERACTIVE APPLICATIONS

(71) Applicant: Microsoft Technology Licensing, LLC, Redmond, WA (US)

(72) Inventors: Scott David Mosier, Bellevue, WA (US); Matthew Gordon, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 21 days.

(21) Appl. No.: 17/140,880

(22) Filed: Jan. 4, 2021

(65) Prior Publication Data

US 2022/0212100 A1    Jul. 7, 2022

(51) Int. Cl.
*A63F 13/355*    (2014.01)
*A63F 13/352*    (2014.01)
*A63F 13/86*    (2014.01)
*G06N 20/00*    (2019.01)
*H04N 19/40*    (2014.01)

(52) U.S. Cl.
CPC .......... *A63F 13/355* (2014.09); *A63F 13/352* (2014.09); *A63F 13/86* (2014.09); *G06N 20/00* (2019.01); *H04N 19/40* (2014.11)

(58) Field of Classification Search
CPC ...... A63F 13/355; A63F 13/352; A63F 13/86; A63F 13/30; A63F 13/33; A63F 13/335; A63F 13/338; A63F 13/358; A63F 2300/40; A63F 2300/407; A63F 2300/409; A63F 2300/534; A63F 2300/538; H04N 19/40; G06N 20/00
See application file for complete search history.

(56) References Cited

U.S. PATENT DOCUMENTS

| | | | | |
|---|---|---|---|---|
| 4,894,774 A | * | 1/1990 | McCarthy | G06T 15/10 463/2 |
| 5,742,289 A | * | 4/1998 | Naylor | H04N 19/51 375/E7.176 |
| 6,570,563 B1 | * | 5/2003 | Honda | G06F 16/444 345/473 |
| 6,868,439 B2 | * | 3/2005 | Basu | G06F 16/9574 709/216 |
| 6,980,599 B2 | * | 12/2005 | Zhong | H04N 19/80 375/E7.193 |
| 6,985,528 B2 | * | 1/2006 | Shin | H04N 19/63 375/E7.101 |

(Continued)

OTHER PUBLICATIONS

"International Search Report and Written Opinion Issued in PCT Application No. PCT/US21/060912", Mailed Date: Mar. 29, 2022, 11 Pages.

*Primary Examiner* — Omkar A Deodhar
*Assistant Examiner* — Matthew D Hoel
(74) *Attorney, Agent, or Firm* — RAY QUINNEY & NEBEKER P.C.; Paul N. Taylor

(57) ABSTRACT

A method of providing interaction with a game instance of a game application by a remote user includes, at a distribution node, receiving video information from a game server, encoding the video information into encoded video information, distributing the encoded video information to a client device, receiving a user input from the client device, and transmitting the user input to the game server.

21 Claims, 4 Drawing Sheets

(56) References Cited

U.S. PATENT DOCUMENTS

| | | | | |
|---|---|---|---|---|
| 7,240,162 B2* | 7/2007 | de Vries | H04N 21/4351 | 711/213 |
| 7,453,939 B2* | 11/2008 | Pan | G06T 7/90 | 375/240.08 |
| 7,515,156 B2* | 4/2009 | Tinker | G06T 15/10 | 345/475 |
| 7,634,778 B2* | 12/2009 | Mosier | G06F 9/45516 | 717/148 |
| 7,796,095 B2* | 9/2010 | Glen | G09G 5/395 | 345/3.1 |
| 7,916,147 B2* | 3/2011 | Clemie | H04N 19/42 | 345/522 |
| 7,934,058 B2* | 4/2011 | Hawkins | G06F 12/0862 | 711/137 |
| 8,081,192 B2* | 12/2011 | Clemie | H04N 19/40 | 345/522 |
| 8,203,568 B2* | 6/2012 | Clemie | G06T 1/60 | 345/522 |
| 8,259,045 B2* | 9/2012 | Ahn | G09G 3/20 | 345/173 |
| 8,271,938 B2* | 9/2012 | Dussud | G06F 8/36 | 717/165 |
| 8,316,357 B2* | 11/2012 | Mosier | G06F 9/44557 | 717/154 |
| 8,382,591 B2* | 2/2013 | Toy | A63F 13/2145 | 463/37 |
| 8,387,099 B2* | 2/2013 | Perlman | H04L 65/4015 | 715/740 |
| 8,466,922 B2* | 6/2013 | Clemie | H04N 19/463 | 345/522 |
| 8,468,575 B2* | 6/2013 | Perlman | H04N 21/2318 | 725/141 |
| 8,479,177 B2* | 7/2013 | Kirshnaswamy | G06F 9/445 | 717/148 |
| 8,495,678 B2* | 7/2013 | Perlman | H04L 65/80 | 725/116 |
| 8,526,490 B2* | 9/2013 | Perlman | H04N 19/188 | 375/240.12 |
| 8,549,574 B2* | 10/2013 | Perlman | A63F 13/12 | 725/112 |
| 8,554,526 B2* | 10/2013 | Andersen | G06T 13/00 | 463/43 |
| 8,572,280 B2* | 10/2013 | Dussault | A63F 13/12 | 348/700 |
| 8,591,334 B2* | 11/2013 | Baccichet | A63F 13/533 | 463/37 |
| 8,601,522 B2* | 12/2013 | Hall | H04N 21/440281 | 725/116 |
| 8,625,837 B2* | 1/2014 | Finocchio | G06F 3/017 | 375/240 |
| 8,632,407 B2* | 1/2014 | Gelman | G07F 17/34 | 463/40 |
| 8,632,410 B2* | 1/2014 | Perlman | H04N 19/14 | 463/42 |
| 8,661,496 B2* | 2/2014 | Perlman | A63F 13/33 | 463/40 |
| 8,698,813 B2* | 4/2014 | Iwasaki | G06T 15/005 | 345/501 |
| 8,773,448 B2* | 7/2014 | LaLonde | G06T 1/20 | 345/506 |
| 8,832,772 B2* | 9/2014 | Perlman | H04N 19/154 | 725/134 |
| 8,834,274 B2* | 9/2014 | Perlman | H04L 65/65 | 725/116 |
| 8,840,472 B2* | 9/2014 | Toy | A63F 13/533 | 463/37 |
| 8,840,475 B2* | 9/2014 | Perlman | H04N 21/431 | 463/42 |
| 8,858,324 B2* | 10/2014 | Kruglick | A63F 13/355 | 463/29 |
| 8,887,142 B2* | 11/2014 | Mosier | G06F 9/32 | 717/160 |
| 8,888,590 B2* | 11/2014 | Kruglick | A63F 13/355 | 463/31 |
| 8,893,207 B2* | 11/2014 | Perlman | H04L 65/80 | 725/116 |
| 8,928,653 B2* | 1/2015 | Mizutani | H04N 21/8153 | 345/419 |
| 8,949,922 B2* | 2/2015 | Perlman | H04N 21/2143 | 463/40 |
| 9,001,135 B2* | 4/2015 | Dharmapurikar | G06T 15/005 | 345/522 |
| 9,003,461 B2* | 4/2015 | Perlman | H04N 21/2387 | 725/115 |
| 9,007,662 B2* | 4/2015 | Hayakawa | H04N 1/00774 | 382/284 |
| 9,032,465 B2* | 5/2015 | Perlman | H04L 47/283 | 725/136 |
| 9,032,467 B2* | 5/2015 | Dharmapurikar | H04N 21/44209 | 725/116 |
| 9,055,066 B2* | 6/2015 | Kim | H04L 65/612 | |
| 9,095,772 B2* | 8/2015 | Kruglick | G06F 9/00 | |
| 9,108,107 B2* | 8/2015 | Perlman | A63F 13/358 | |
| 9,113,146 B2* | 8/2015 | Clemie | G06T 1/60 | |
| 9,117,285 B2* | 8/2015 | Clemie | H04N 19/42 | |
| 9,210,361 B2* | 12/2015 | Todd | H04N 5/45 | |
| 9,215,478 B2* | 12/2015 | Finocchio | H04N 21/232 | |
| 9,232,261 B2* | 1/2016 | Kim | H04N 21/2385 | |
| 9,288,335 B2* | 3/2016 | Schoppmeier | H04L 1/0002 | |
| 9,330,726 B1* | 5/2016 | Lawson | H04N 21/8456 | |
| 9,392,303 B2* | 7/2016 | Yaron | H04L 65/756 | |
| 9,396,702 B2* | 7/2016 | Colenbrander | A63F 13/355 | |
| 9,413,830 B2* | 8/2016 | Thompson | H04L 65/1089 | |
| 9,421,464 B2* | 8/2016 | Lanzoni | A63F 13/323 | |
| 9,424,621 B2* | 8/2016 | Clemie | H04N 19/463 | |
| 9,451,334 B1* | 9/2016 | Lawson | H04N 21/8133 | |
| 9,454,993 B1* | 9/2016 | Lawson | G11B 27/031 | |
| 9,480,914 B2* | 11/2016 | Kruglick | G06T 15/20 | |
| 9,498,715 B2* | 11/2016 | Kruglick | A63F 13/50 | |
| 9,571,866 B2* | 2/2017 | Todd | H04N 21/25875 | |
| 9,578,074 B2* | 2/2017 | Kalman | H04L 69/24 | |
| 9,582,904 B2* | 2/2017 | Heinz, II | H04L 43/0894 | |
| 9,583,018 B1* | 2/2017 | Archdeacon | G09B 9/08 | |
| 9,596,280 B2* | 3/2017 | Heinz, II | H04L 67/131 | |
| 9,596,281 B2* | 3/2017 | Luby | H04L 65/80 | |
| 9,596,323 B2* | 3/2017 | Luby | H04L 65/80 | |
| 9,604,139 B2* | 3/2017 | Heinz, II | A63F 13/355 | |
| 9,608,934 B1* | 3/2017 | Kalman | H04L 43/16 | |
| 9,634,942 B2* | 4/2017 | Heinz, II | H04L 65/80 | |
| 9,641,592 B2* | 5/2017 | Thompson | H04L 67/131 | |
| 9,661,254 B2* | 5/2017 | White | H04N 21/42224 | |
| 9,700,789 B2* | 7/2017 | Cotter | A63F 13/87 | |
| 9,743,119 B2* | 8/2017 | Todd | H04N 21/4753 | |
| 9,805,479 B2* | 10/2017 | Taraki | G06F 9/5044 | |
| 9,826,260 B2* | 11/2017 | Li | H04N 21/234381 | |
| 9,852,490 B2* | 12/2017 | Clemie | H04N 19/40 | |
| 9,861,899 B1* | 1/2018 | Lawson | H04N 21/437 | |
| 9,894,342 B2* | 2/2018 | Tsirkin | H04N 13/144 | |
| 9,906,645 B2* | 2/2018 | Mathur | H04L 65/65 | |
| 9,912,903 B2* | 3/2018 | Kozuka | H04N 9/8205 | |
| 9,973,769 B2* | 5/2018 | Forehand | H04N 21/2404 | |
| 10,022,619 B2* | 7/2018 | McCoy | A63F 13/00 | |
| 10,097,596 B2* | 10/2018 | Heinz, II | H04L 65/1083 | |
| 10,102,015 B1* | 10/2018 | Gordon | G06F 9/4552 | |
| 10,110,647 B2* | 10/2018 | Srinivasan | H04L 65/612 | |
| 10,187,494 B2* | 1/2019 | Stewart | H04L 67/34 | |
| 10,230,996 B1* | 3/2019 | Abreu | H04N 21/4884 | |
| 10,241,766 B2* | 3/2019 | Gordon | G06F 9/4552 | |
| 10,257,266 B2* | 4/2019 | Thompson | H04L 67/1008 | |
| 10,277,652 B2* | 4/2019 | Fujimori | H04L 65/60 | |
| 10,289,393 B2* | 5/2019 | Gordon | G06F 8/4435 | |
| 10,291,879 B2* | 5/2019 | Kozuka | H04N 9/8042 | |
| 10,299,007 B2* | 5/2019 | Senew | H04N 21/4858 | |
| 10,311,548 B2* | 6/2019 | Burch | G06T 15/04 | |
| 10,315,110 B2* | 6/2019 | Heinz, II | G06T 5/002 | |
| 10,331,448 B2* | 6/2019 | Son | G06F 9/30079 | |
| 10,332,090 B2* | 6/2019 | Stewart | G06Q 20/382 | |
| 10,347,013 B2* | 7/2019 | Taraki | G06T 11/001 | |
| 10,362,323 B2* | 7/2019 | Forehand | H04N 21/8456 | |

(56) References Cited

U.S. PATENT DOCUMENTS

| | | | | |
|---|---|---|---|---|
| 10,374,928 | B1* | 8/2019 | Kalman | G06F 9/505 |
| 10,376,784 | B2* | 8/2019 | Chhaochharia | H04L 67/10 |
| 10,402,670 | B2* | 9/2019 | Zou | G06K 9/6269 |
| 10,416,954 | B2* | 9/2019 | Edry | H04N 19/40 |
| 10,431,234 | B2* | 10/2019 | Jung | G10L 19/24 |
| 10,455,189 | B2* | 10/2019 | Kozuka | H04N 21/4402 |
| 10,482,887 | B1* | 11/2019 | Jha | G10L 19/0018 |
| 10,489,918 | B1* | 11/2019 | Vajapey | G06T 7/246 |
| 10,499,118 | B2* | 12/2019 | Todd | H04N 21/4312 |
| 10,547,657 | B2* | 1/2020 | Nataros | H04L 65/762 |
| 10,572,644 | B2* | 2/2020 | Gordon | G06F 13/4068 |
| 10,581,625 | B1* | 3/2020 | Pandey | H04N 7/147 |
| 10,582,228 | B1* | 3/2020 | Abreu | H04N 21/8106 |
| 10,587,861 | B2* | 3/2020 | Tsirkin | H04N 13/398 |
| 10,589,171 | B1* | 3/2020 | Burke | G06T 15/00 |
| 10,601,885 | B2* | 3/2020 | Heinz, II | H04L 65/80 |
| 10,631,025 | B2* | 4/2020 | Tsuji | H04N 21/234363 |
| 10,657,698 | B2* | 5/2020 | Stover | G06T 15/005 |
| 10,726,631 | B1* | 7/2020 | Ha | G06T 7/73 |
| 10,741,143 | B2* | 8/2020 | Dimitrov | G09G 5/395 |
| 10,778,756 | B2* | 9/2020 | Thompson | H04L 67/1008 |
| 10,820,023 | B2* | 10/2020 | Beals | H04N 21/2353 |
| 10,841,591 | B2* | 11/2020 | Kopietz | H04N 19/156 |
| 10,911,750 | B2* | 2/2021 | Zhao | H04N 19/164 |
| 10,918,938 | B2* | 2/2021 | Karlsson | A63F 13/352 |
| 10,918,953 | B1* | 2/2021 | Pickens | H04W 48/02 |
| 10,924,745 | B2* | 2/2021 | Zhu | H04L 1/1607 |
| 10,926,177 | B2* | 2/2021 | Osman | A63F 13/577 |
| 10,974,153 | B2* | 4/2021 | Smithers | A63F 13/338 |
| 11,014,010 | B2* | 5/2021 | Payzer | H04N 21/43076 |
| 11,032,576 | B2* | 6/2021 | Kennett | G06N 20/00 |
| 11,056,126 | B2* | 7/2021 | Jung | H04L 65/80 |
| 11,065,550 | B2* | 7/2021 | McCoy | A63F 13/358 |
| 11,070,732 | B2* | 7/2021 | Zhu | H04N 5/23277 |
| 11,070,873 | B2* | 7/2021 | Chatwin | H04N 21/2143 |
| 11,082,726 | B2* | 8/2021 | Beals | H04N 21/6143 |
| 11,083,963 | B2* | 8/2021 | Colenbrander | A63F 13/352 |
| 11,103,782 | B2* | 8/2021 | McCoy | G06N 3/084 |
| 11,107,222 | B2* | 8/2021 | Vajapey | G06T 7/246 |
| 11,134,288 | B2* | 9/2021 | Zavesky | H04N 21/4781 |
| 11,163,588 | B2* | 11/2021 | Rubenfield | A63F 13/35 |
| 11,166,035 | B1* | 11/2021 | Liu | H04N 19/174 |
| 11,169,824 | B2* | 11/2021 | Rubenfield | G06T 15/005 |
| 11,196,787 | B2* | 12/2021 | Wilssens | H04L 65/61 |
| 11,213,745 | B1* | 1/2022 | Burke | G06T 1/20 |
| 11,260,295 | B2* | 3/2022 | Mueller | A63F 13/355 |
| 11,265,599 | B2* | 3/2022 | Lapicque | H04N 19/124 |
| 11,273,373 | B2* | 3/2022 | Cotter | A63F 13/355 |
| 11,284,137 | B2* | 3/2022 | Todd | H04N 21/4786 |
| 11,298,612 | B2* | 4/2022 | Perlman | H04N 21/23805 |
| 11,307,955 | B2* | 4/2022 | Dahl | G06F 11/302 |
| 11,321,807 | B1* | 5/2022 | Clemie | H04N 19/20 |
| 11,321,905 | B2* | 5/2022 | Makar | G06T 15/005 |
| 11,330,310 | B2* | 5/2022 | Tsuji | H04N 21/45455 |
| 11,341,945 | B2* | 5/2022 | Bretan | G06N 3/0445 |
| 11,366,879 | B2* | 6/2022 | Wilssens | G06F 21/44 |
| 11,446,571 | B2* | 9/2022 | Sameer Kalathil | H04N 21/6582 |
| 11,514,365 | B2* | 11/2022 | Cheruvu | G06F 9/30101 |
| 11,559,735 | B2* | 1/2023 | Perlman | H04L 47/25 |
| 11,596,872 | B2* | 3/2023 | Patel | A63F 13/61 |
| 11,612,812 | B1* | 3/2023 | Gangwal | H04N 7/0125 463/42 |
| 11,617,946 | B1* | 4/2023 | Gangwal | A63F 13/655 463/42 |
| 11,666,823 | B1* | 6/2023 | Gangwal | H04N 21/2187 463/31 |
| 11,778,204 | B2* | 10/2023 | Wang | H04N 19/188 375/240.26 |
| 11,810,268 | B2* | 11/2023 | Pottorff | G06T 3/4046 |
| 11,818,373 | B1* | 11/2023 | Mama | H04N 7/152 |
| 11,902,571 | B2* | 2/2024 | Le | H04N 19/162 |
| 12,114,024 | B2* | 10/2024 | Sharma | G06V 10/22 |
| 12,184,864 | B2* | 12/2024 | Li | G06F 18/213 |
| 2003/0223501 | A1* | 12/2003 | Zhong | H04N 19/80 375/E7.193 |
| 2004/0268370 | A1* | 12/2004 | Mosier | G06F 9/45516 719/328 |
| 2005/0104889 | A1* | 5/2005 | Clemie | H04N 19/42 345/522 |
| 2006/0052168 | A1* | 3/2006 | Shacham | G07F 17/3223 463/42 |
| 2006/0088220 | A1* | 4/2006 | Cheung | A63F 13/332 382/232 |
| 2006/0160607 | A1* | 7/2006 | Okada | G07F 17/3255 463/20 |
| 2007/0217505 | A1* | 9/2007 | Lipka | H04N 19/44 375/E7.181 |
| 2008/0039208 | A1* | 2/2008 | Abrink | G07F 17/3232 707/999.001 |
| 2008/0098064 | A1* | 4/2008 | Sherinian | A63F 13/12 715/706 |
| 2008/0147971 | A1* | 6/2008 | Hawkins | A63F 13/00 711/E12.017 |
| 2009/0119729 | A1* | 5/2009 | Periman | H04N 21/4781 725/114 |
| 2009/0119730 | A1* | 5/2009 | Perlman | H04N 21/6125 725/114 |
| 2009/0119737 | A1* | 5/2009 | Perlman | H04N 21/6125 725/133 |
| 2009/0124387 | A1* | 5/2009 | Perlman | H04N 21/472 463/42 |
| 2009/0215540 | A1* | 8/2009 | Perlman | H04N 21/4781 463/42 |
| 2009/0238405 | A1* | 9/2009 | Buznach | H04N 21/4781 382/103 |
| 2009/0305790 | A1* | 12/2009 | Lu | H04N 21/6125 463/42 |
| 2010/0058283 | A1* | 3/2010 | Dussud | G06F 9/44521 717/100 |
| 2010/0058304 | A1* | 3/2010 | Mosier | G06F 8/315 717/140 |
| 2010/0060640 | A1* | 3/2010 | Melikian | G06T 15/20 345/427 |
| 2010/0161348 | A1* | 6/2010 | Lindell | G16H 40/20 707/E17.014 |
| 2010/0161384 | A1* | 6/2010 | Wells | G06Q 30/00 705/14.44 |
| 2010/0241692 | A1* | 9/2010 | Klee | A63F 13/358 709/203 |
| 2010/0265334 | A1* | 10/2010 | Bhaskaran | H04N 21/44209 348/180 |
| 2010/0299659 | A1* | 11/2010 | Kirshnaswamy | G06F 9/445 717/162 |
| 2010/0304813 | A1* | 12/2010 | Finocchio | A63F 13/213 463/43 |
| 2010/0306813 | A1* | 12/2010 | Perry | A63F 13/42 725/114 |
| 2010/0322527 | A1* | 12/2010 | Fablet | G06T 9/00 382/232 |
| 2011/0053693 | A1* | 3/2011 | Wright | A63F 13/12 463/42 |
| 2011/0126255 | A1 | 5/2011 | Perlman et al. | |
| 2011/0157197 | A1* | 6/2011 | Clemie | H04N 19/20 345/522 |
| 2011/0162005 | A1* | 6/2011 | Yerli | H04L 67/1097 725/114 |
| 2011/0225213 | A1* | 9/2011 | Mosier | G06F 9/325 717/160 |
| 2011/0300933 | A1* | 12/2011 | Chien | A63F 13/428 463/31 |
| 2011/0304634 | A1* | 12/2011 | Urbach | H04L 67/02 709/217 |
| 2012/0053464 | A1* | 3/2012 | Murashita | A61B 8/483 600/443 |
| 2012/0075317 | A1* | 3/2012 | Clemie | H04N 19/20 345/522 |
| 2012/0200583 | A1* | 8/2012 | Clemie | G06T 15/00 345/522 |

(56) References Cited

U.S. PATENT DOCUMENTS

| | | | | |
|---|---|---|---|---|
| 2012/0270652 | A1* | 10/2012 | Kim | A63F 13/52 463/32 |
| 2012/0287118 | A1* | 11/2012 | Mizutani | A63F 13/92 345/643 |
| 2013/0137518 | A1* | 5/2013 | Lucas | A63F 13/358 463/42 |
| 2013/0235035 | A1* | 9/2013 | Nara | H04N 19/17 345/428 |
| 2013/0294496 | A1* | 11/2013 | Clemie | A63F 13/332 375/240.01 |
| 2013/0294497 | A1* | 11/2013 | Clemie | H04N 19/40 375/240.01 |
| 2014/0085193 | A1* | 3/2014 | Finocchio | G06F 3/017 345/156 |
| 2014/0111529 | A1* | 4/2014 | Clemie | G06T 15/00 345/522 |
| 2014/0195594 | A1 | 7/2014 | Ahuja et al. | |
| 2015/0127775 | A1 | 5/2015 | Munagala et al. | |
| 2015/0131969 | A1 | 5/2015 | Taraki et al. | |
| 2015/0157939 | A1* | 6/2015 | Lu | H04N 19/61 463/31 |
| 2015/0360132 | A1* | 12/2015 | Perlman | H04N 21/6125 463/31 |
| 2016/0328819 | A1* | 11/2016 | Clemie | G06T 1/60 |
| 2017/0228850 | A1* | 8/2017 | Gordon | G06F 9/44 |
| 2017/0304724 | A1* | 10/2017 | Cotter | A63F 13/86 |
| 2017/0329704 | A1* | 11/2017 | Wrighton | G06F 8/41 |
| 2017/0332115 | A1* | 11/2017 | Zhong | H04N 21/64 |
| 2018/0075572 | A1* | 3/2018 | Clemie | H04N 19/42 |
| 2018/0176576 | A1* | 6/2018 | Rippel | G06N 3/08 |
| 2018/0309999 | A1* | 10/2018 | Kopietz | H04N 19/42 |
| 2018/0314486 | A1* | 11/2018 | Edry | A63F 13/25 |
| 2019/0073747 | A1* | 3/2019 | Burch | G06T 15/04 |
| 2019/0327490 | A1* | 10/2019 | Kanoh | H04N 19/176 |
| 2019/0347806 | A1* | 11/2019 | Vajapey | G06T 7/70 |
| 2020/0097389 | A1* | 3/2020 | Smith | G06F 11/0793 |
| 2020/0106819 | A1* | 4/2020 | Morrison | A63F 13/358 |
| 2020/0151884 | A1* | 5/2020 | Vajapey | G06T 7/70 |
| 2020/0186796 | A1* | 6/2020 | Mukherjee | H04N 19/107 |
| 2020/0195934 | A1* | 6/2020 | Xing | G06V 20/49 |
| 2020/0206613 | A1* | 7/2020 | Perlman | A63F 13/30 |
| 2020/0252682 | A1 | 8/2020 | Walker | |
| 2020/0306631 | A1* | 10/2020 | Karlsson | A63F 13/355 |
| 2020/0374534 | A1* | 11/2020 | Chen | H04N 19/176 |
| 2020/0382791 | A1* | 12/2020 | Ivanovic | H04N 19/197 |
| 2020/0389672 | A1* | 12/2020 | Kennett | G06T 3/4046 |
| 2020/0396501 | A1* | 12/2020 | Lapicque | H04N 21/4781 |
| 2021/0001216 | A1* | 1/2021 | Sanders | H04N 21/27 |
| 2021/0093968 | A1* | 4/2021 | McCoy | A63F 13/5258 |
| 2021/0093969 | A1* | 4/2021 | McCoy | H04N 21/2187 |
| 2021/0099713 | A1* | 4/2021 | Cerny | H04N 19/114 |
| 2021/0112283 | A1* | 4/2021 | Orihashi | H04N 19/17 |
| 2021/0152831 | A1* | 5/2021 | Liu | H04N 19/463 |
| 2021/0158472 | A1* | 5/2021 | Clemie | G06T 15/00 |
| 2021/0213362 | A1* | 7/2021 | Patel | A63F 13/61 |
| 2021/0236923 | A1* | 8/2021 | Karlsson | A63F 13/355 |
| 2021/0256346 | A1* | 8/2021 | Desoli | G06F 18/217 |
| 2021/0274224 | A1* | 9/2021 | Kennett | G06T 5/50 |
| 2021/0316212 | A1* | 10/2021 | Borovikov | A63F 13/52 |
| 2021/0339130 | A1* | 11/2021 | Sameer Kalathil | H04N 21/8146 |
| 2021/0339149 | A1* | 11/2021 | McCoy | A63F 13/67 |
| 2021/0352307 | A1* | 11/2021 | Bae | H04N 19/40 |
| 2021/0406369 | A1* | 12/2021 | Healy | G06F 21/562 |
| 2021/0409316 | A1* | 12/2021 | Seshan | H04L 41/40 |
| 2022/0004477 | A1* | 1/2022 | Dahl | G06F 11/302 |
| 2022/0035724 | A1* | 2/2022 | Strein | G06F 11/3452 |
| 2022/0058000 | A1* | 2/2022 | Iley | G06F 8/60 |
| 2022/0092079 | A1* | 3/2022 | Casey | H04L 65/80 |
| 2022/0148124 | A1* | 5/2022 | Clemie | H04N 19/463 |
| 2022/0182715 | A1* | 6/2022 | Lapicque | H04N 19/172 |
| 2022/0212100 | A1* | 7/2022 | Mosier | G06N 20/00 |
| 2024/0129493 | A1* | 4/2024 | Emmanuel | G08B 27/006 |

* cited by examiner

SYSTEMS AND METHODS FOR STREAMING INTERACTIVE APPLICATIONS

BACKGROUND

Background and Relevant Art

Game servers based on retail commodity hardware have limited resources, most of which are dedicated to running the game application. Even general-purpose computing devices used to run game applications can dedicate most, if not all, available computing resources to running the game application. Comparatively little computing resources remain for video encoding and managing network protocol to communicate video and audio information to client devices over a network and to receive user inputs from the client devices over the network.

BRIEF SUMMARY

In some implementations, a distribution node for allowing interaction with interactive applications to a remote user includes a video connection device, a network connection device, a processor, and a hardware storage device. The video connection device is configured to connect to a game server and receive at least video information from the game server. The network connection device is configured to connect to a network. The hardware storage device has instructions stored that, when executed by the processor, cause the distribution node to encode the video information from the game server to encoded video information and distribute the encoded video information over the network to a client device.

In some implementations, a system for allowing interaction with game applications to a remote user includes a game server and a distribution node. The game server is configured to run a game application and generate at least video information. The distribution node is connected to the game server and configured to receive the video information and encode the video information for distribution via a network.

In some implementations, a method of providing interaction with a game instance of a game application by a remote user includes, at a distribution node, receiving video information from a game server, encoding the video information into encoded video information, distributing the encoded video information to a client device, receiving a user input from the client device, and transmitting the user input to the game server.

This Summary is provided to introduce a selection of concepts in a simplified form that are further described below in the Detailed Description. This Summary is not intended to identify key features or essential features of the claimed subject matter.

Additional features and advantages will be set forth in the description which follows, and in part will be obvious from the description, or may be learned by the practice of the teachings herein. Features and advantages of the disclosure may be realized and obtained by means of the instruments and combinations particularly pointed out in the appended claims. Features of the present disclosure will become more fully apparent from the following description and appended claims or may be learned by the practice of the disclosure as set forth hereinafter.

BRIEF DESCRIPTION OF THE DRAWINGS

In order to describe the manner in which the above-recited and other features of the disclosure can be obtained, a more particular description will be rendered by reference to specific implementations thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example implementations, the implementations will be described and explained with additional specificity and detail through the use of the accompanying drawings in which.

DETAILED DESCRIPTION

Figure 1:
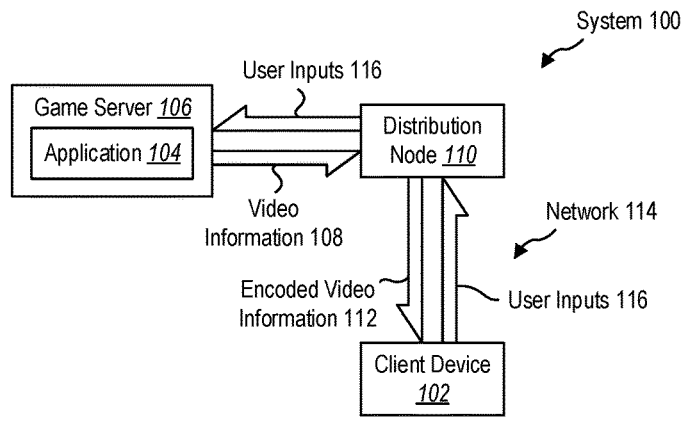
FIG. 1 is a schematic representation of a streaming system for interactive game applications, according to at least some implementations of the present disclosure.

The present disclosure relates generally to systems and methods for allowing interaction with a game application. More specifically, the systems and methods described herein allow interaction with a game instance executed on a game server by a remote user viewing the game instance on a client device. In some implementations, receiving and transmitting information between the game server and the client device requires additional processing power that may compromise the performance of the game server actually running the game application. In a particular example, the game server is retail commodity hardware.

In some implementations, retail commodity hardware for a game server is a specialized computing device that is homologated for predictable development of, execution of, and communication between game applications and game instances. Examples of retail commodity hardware include video game consoles such as Microsoft Xbox Series X, Sony PlayStation 5, and Nintendo Switch. Retail commodity hardware may be used in contrast to general purpose computers, such as a personal computer that may include a wide variety of hardware computing components be used to play game applications at a variety of settings and performance levels. Game applications developed for retail commodity hardware may be developed to maximize the available computing resources of the retail commodity hardware, and some game applications may not leave much or any computing resources available for distribution of the video information, audio information, haptic information, etc. related to a game instance of the game application to a remote user on a client device connected via a network.

A distribution node is in data communication with the game server and a client device via a network. The distribution node is configured to receive at least video information from the game server and encode the video information for distribution to the client device over the network. In some implementations, offloading the encoding and distribution of the video information, as well as other communication functionality, to the distribution node allows the game server to execute the game application as the developers intended without a negative impact of the additional computing resources needed for remote play.

In some implementations, the game server is a general-purpose computer, and the distribution node allows modularity and/or additional functionality beyond the processing resources and/or available software on the game server. For example, the game server, even when a general-purpose computer, may be updated at different interaction cycles than the processing hardware of the distribution node. In at least one example, the distribution node is configured to execute at least one machine learning (ML) model to analyze and refine the ML model based upon the video information and/or user inputs received by the distribution node. The distribution node may be changed, upgraded, repaired, or otherwise altered independently of the game server, providing greater flexibility in game streaming and remote play compared to a direct connection between the game server and client device.

As illustrated in the foregoing discussion, the present disclosure utilizes a variety of terms to describe features and advantages of the machine learning model. Additional detail is now provided regarding the meaning of such terms. For example, as used herein, a "machine learning model" refers to a computer algorithm or model (e.g., a classification model, a regression model, a language model, an object detection model) that can be tuned (e.g., trained) based on training input to approximate unknown functions. For example, a machine learning model may refer to a neural network or other machine learning algorithm or architecture that learns and approximates complex functions and generate outputs based on a plurality of inputs provided to the machine learning model. In some implementations, a machine learning system, model, or neural network described herein is an artificial neural network. In some implementations, a machine learning system, model, or neural network described herein is a convolutional neural network. In some implementations, a machine learning system, model, or neural network described herein is a recurrent neural network. In at least one implementation, a machine learning system, model, or neural network described herein is a Bayes classifier. As used herein, a "machine learning system" may refer to one or multiple machine learning models that cooperatively generate one or more outputs based on corresponding inputs. For example, a machine learning system may refer to any system architecture having multiple discrete machine learning components that consider different kinds of information or inputs.

FIG. 1 is a schematic representation of a system 100 for allowing a remote user at a client device 102 to play a game application 104 on a game server 106. The game server 106 executes the game application 104 and transmits at least video information 108 to a distribution node 110. In some implementations, the distribution node 110 encodes the video information 108 (to create encoded video information 112) from the game server 106 for distribution over a network 114 to the client device 102. In some implementations, the network 114 is the World Wide Web. In some implementations, the network 114 is a local area network. In some implementations, the network 114 is a wide area network. In some implementations, the network 114 is the World Wide Web and the client device 102 may be anywhere in the world relative to the game server 106.

The client device 102 received the encoded video information 112 from the distribution node 110 and displays to a user a video feed of a game instance of the game application 104 that is executed by the game server 106. The user may then provide one or more user inputs 116 to the client device 102 to interact with the game instance of the game application 104. The user inputs 116 are transmitted to and received by the game server 106. The game server 106 interprets the user inputs 116 to allow the user to interact with the game application 104.

In some implementations, the game server 106 is local to and directly connected to the distribution node 110. For example, the game server 106 may be in the same datacenter as the distribution node 110. In some examples, the game server 106 and distribution node 110 may be in the same server rack in a datacenter. In some implementations, the game server 106 is located remotely relative to the distribution node 110. For example, the game server 106 may be located in a first datacenter and the distribution node 110 may be located in a second datacenter connected to the first datacenter via a network.

As described herein, the game server 106 may be a general-purpose computing device or a specialized computing device, such as a retail commodity hardware video game console. In either case, the game server 106 includes a processor(s), such as central processing unit, graphical processing unit, physics processing unit, or other processors; a hardware storage device; and a video output device. The hardware storage device has instructions stored thereon that, when executed by the processor(s) of the game server 106, cause the game server 106 to execute a game application 104 and render a game instance of the game application 104.

In some implementations, the hardware storage device is any non-transient computer readable medium that may store instructions thereon. The hardware storage device may be any type of solid-state memory; volatile memory, such as static random access memory (SRAM) or dynamic random access memory (DRAM); or non-volatile memory, such as read-only memory (ROM) including programmable ROM (PROM), erasable PROM (ERPOM) or EEPROM; magnetic storage media, such as magnetic tape; platen-based storage device, such as hard disk drives; optical media, such as compact discs (CD), digital video discs (DVD), Blu-ray Discs, or other optical media; removable media such as USB drives; non-removable media such as internal SATA or non-volatile memory express (NVMe) style NAND flash memory, or any other non-transient storage media. In some implementations, the hardware storage device is local to and/or integrated with the computing device. In some implementations, the hardware storage device is accessed by the computing device through a network connection.

The video information 108 rendered by the game server 106 is provided, such as by the video output device, to the distribution node 110. In some implementations, the distribution node 110 includes at least a processor(s), a hardware storage device, a video connection device, and a network connection device. The hardware storage device of the distribution node 110 has instructions stored thereon that, when executed by the processor(s) of the distribution node 110, cause the distribution node 110 to execute any of the methods described herein.

The video connection device receives the video information 108 from the game server 106. In some implementations, the video connection device is a physical piece of hardware, such as an HDMI-In port, or a logical software component, such as software to receive video information through a more generalized data connection, such as USB, Ethernet, wireless antenna, optical, etc. In some implementations, the game server 106 provides additional game instance information, such as audio information, haptic information, game state data, or other information, and the distribution node is configured to receive such additional information and distribute that information in addition to the video information. The processors may encode the video information 108 to create encoded video information 112, and the network connection device of the distribution node 110 may distribute the encoded video information 112 to the client device 102 via the network 114.

In some implementations, the video information 108 is encoded at the distribution node 110 for distribution to the client devices 102 as encoded video information 112. In some implementations, the video information 108 is encoded at the game client 106 for transmission from the game client 106 to the distribution node 110 and re-encoded by the distribution node 110 for transmission to the client devices 102. For example, the encoding used by game client 106 may be different from that used by the distribution node 110, as the encoding used by the distribution node 110 may be selected based on the particular network connection established between the distribution node 110 and the client device 102. In some implementations, the video information 108 may be encoded upon arrival at the distribution node, but the use of the term "encoded video information 112" indicates that the distribution node 110 performs an encoding process on the video data, whether that is a first encoding or a re-encoding of the video information 108 for distribution to the client device 102.

The client device 102 is any electronic device with network connectivity to receive and transmit information to a remotely located game server 106 and/or distribution node 110. In particular examples, client devices 102 include personal electronic devices, such as smartphones, tablet computers, desktop computers, laptop computers, hybrid computers, wearable electronic devices; television; automotive infotainment system; household appliance, or any other networked electronic device. In some implementations, the client device 102 views a game instance from a game server 106, and the client device 102 transmits user inputs 116 to the game server 106 to interact with the game application 104. In some implementations, the client device 102 is a general-purpose computing device with an internet browser-based connection to the distribution node 110 and/or game server 106. In some implementations, the client device 102 executes a native application to connect to the distribution node 110 and/or game server 106.

A user input, according to the present disclosure, should be understood to include any signal or input by any input mechanism that provides instructions to the game server to interact with and/or affect the game application. In some implementations, the user input 116 may be provided through a human interface device (HID) of the client device 102, such as a keyboard, touchpad, or mouse, or through a dedicated gamepad controller or other peripheral primarily used for playing video games.

Figure 2:
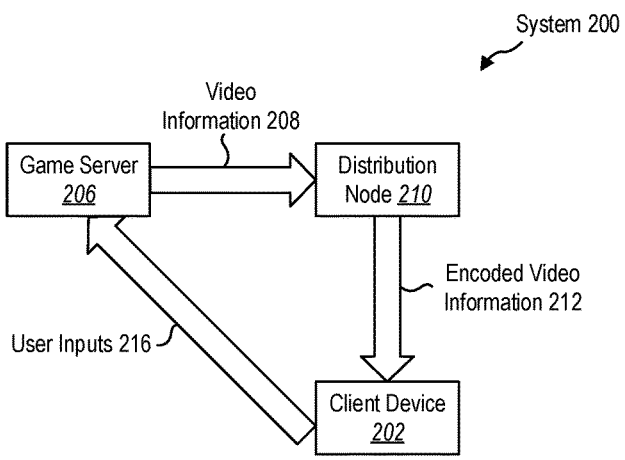
FIG. 2 is a schematic representation of another streaming system for interactive game applications, according to at least some implementations of the present disclosure.

In some implementations, relaying user inputs 116 through the distribution node 110 introduces input lag to the system, compromising the responsiveness of the game application 104 to the user inputs 116 provided by the user at the client device 102. FIG. 2 illustrates another implementation of a system 200, according to the present disclosure, which allows for a user inputs 216 to be routed directly to the game server 206. Direct communication of the user inputs 216 between the client device 202 and the game server 206 may reduce latency in the communication between the user providing the user inputs 216 at the client device 202 and the user inputs 216 being received and processed by the game server 206.

Figure 3:
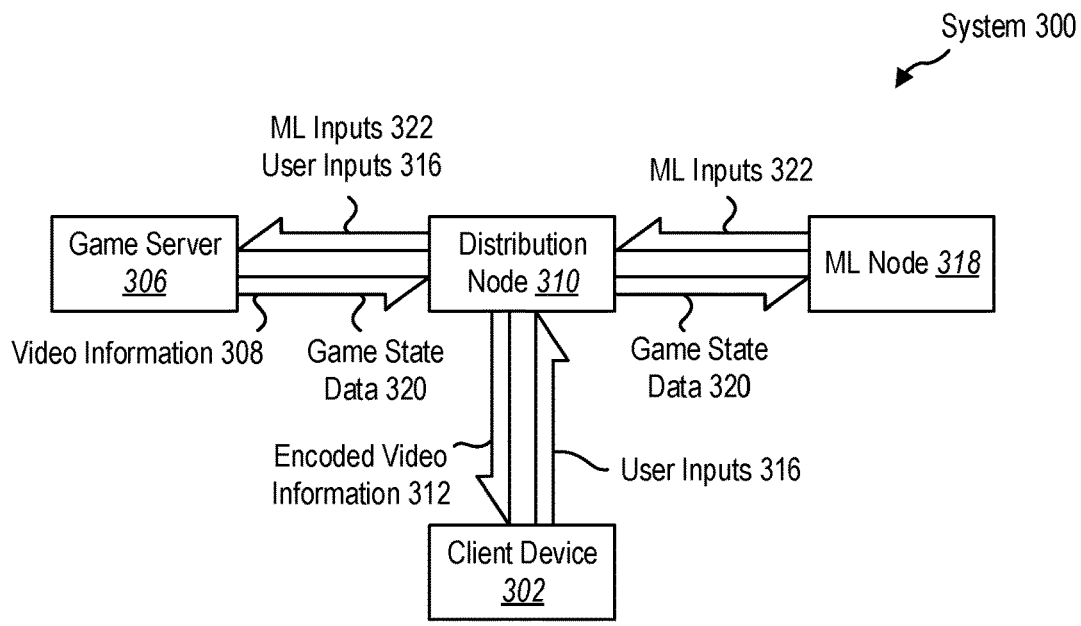
FIG. 3 is a schematic representation of a streaming system for interactive game applications employing machine learning to improve performance, according to at least some implementations of the present disclosure.

Additional processes may be used to further reduce perceived latency for the user through the use of ML models performed at the distribution node 210 and/or on an additional node, such as the ML node 318 illustrated in the system 300 of FIG. 3. In some implementations, a system 300 according to the present disclosure can include a ML model that receives game state data from the game server and uses the game state data to provide additional inputs to the game server to complement the user inputs.

Game state data includes any information that may allow a second electronic device to recreate a given game state. For example, the game state data of a first game instance running on a first electronic device may be provided to second copy of a game application running on a second electronic device, and the second electronic device may render a duplicate of the first game instance based on the game state data. In some implementations, game state data includes virtual object or avatar positions, movement, player character statistics or characteristics, player character inventory, player character status, ability cooldown status, non-player character status, or any other information about the game state of the first instance. In some implementations, the game state data is used to synchronize two instances of a game application to render the same game environment to two different players. In some implementations, the game state data is used to present the game state of the first instance asynchronously to a second instance to allow the same or different player to experience the game state of the first instance at a later time.

In some implementations, the game state data 320 is provided to a ML model, such as that used by the ML node 318, and the ML model can identify the current status or situation of the game application. For example, the ML model may receive game state data 320 that includes data regarding the game application, the game instance, the player character, and the game environment, which allows the ML model to make predictions about what the user may intend to do next in the game. In a particular example, the ML model may identify that the game application is a driving game, and the user is racing against computer-controlled avatars. Due to latency in the network connection, the user inputs 316 may be delayed from the client device 302 or packets of video information may be delayed en route to the client device 302 that compromise the user's ability to react to the current game state. The ML model may identify the current game state from the game state data 320 and anticipate that the user will steer their car to follow the road. The ML node 318 may provide ML inputs 322 to supplement the user inputs 316 that help steer the user's car in the absence or delay of user inputs 316.

In the implementation illustrated in FIG. 3, the distribution node 310 receives both the user input 316 from the client device 302 and the ML input from the ML node 318. The distribution node 310, in some implementations, merges the user inputs 316 with the ML inputs 322 and transmits both the user inputs 316 and the ML inputs 322 to the game server 306. In some examples, the predicted ML input 322 and the actual user input 316 are the same, and merging the inputs has no noticeable effect. In other examples, the user input 316 is absent at the distribution node 310 due to latency and/or network packet drops, and the ML input 322 may fill in the gaps in the user inputs 316 with the predicted inputs. In a particular example, the user provides a continuous right directional input to steer the car to the right around a corner. The ML input 322 predicts a right input for the corner and predicts that a user input 316 will continue to be a right directional input throughout the corner in the game environment. If a network connection issue causes a break in the user input, the distribution node 310 may use the ML input to supplement the user input 316 to transmit a continuous right-direction input to the game server 306.

In yet other examples, the distribution node 310 receives different user input 316 and a ML input 322. In such examples, the distribution node 310 may prioritize the transmission of the user input 316 and ignore the ML input 322, whereby the game server 306 receives the user input 316 as the user would expect. For example, while the ML model may predict that user steer to the right to follow the corner of the previous example, a user may instead continue in a straight line to pursue a shortcut or intentionally drive off the road.

Figure 4:
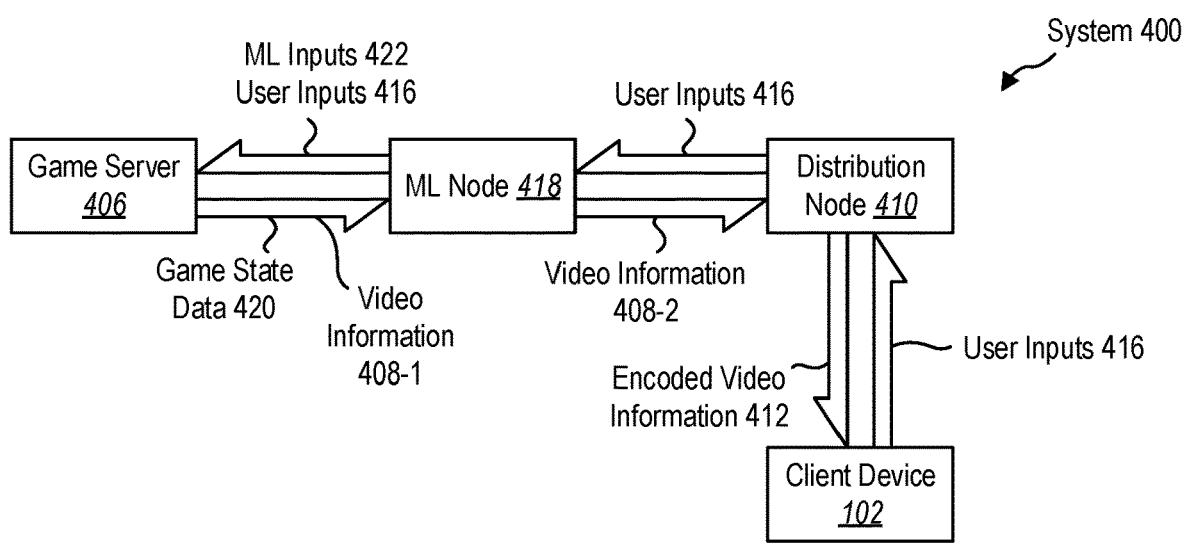
FIG. 4 is a schematic representation of a streaming system for interactive game applications including modular post-processing, according to at least some implementations of the present disclosure.

In some implementations, the ML model may receive the user inputs from the client device and/or the distribution node to refine the ML model. FIG. 4 is a schematic illustration of another implementation of a system 400 where the ML node 418 is located between the game server 406 and the distribution node 410 and may modify and/or supplement data transmitted between the game server 406 and the distribution node 410.

In some examples, the ML node 418 may receive game state data 420, as described herein, to recreate the game environment of the game instance running on the game server 406. In some implementations, the ML node 418 also receives user inputs 416 from the client device 402. In some examples, the user inputs 416 are received through the distribution node 410, while in other examples, the user inputs 416 are received directly from the client device 402 (without traveling through the distribution node 410) to reduce latency. The ML node 418 can use a ML model to evaluate the game instance represented by the game state data 420 and compare a predicted ML input 422 to the received user input 416. In some implementations, the ML node 418 transmits to the game server 406 the user input 416 and/or the ML input 422 based on the comparison of the user input 416 and the ML input 422.

In some implementations, the ML node refines the ML model based on a comparison of the ML input 422 and the user input 416. In the driving game example described herein, the ML input 422 supplemented the user input 416 to predict that the user would steer to remain on the road based on aggregated community statistics. In other words, most players that race on that track follow the road. In some implementations, the ML model may be refined using user-specific data to customize the ML inputs to predict what that particular user may input. For example, a particular user may be aggressive at cutting the inside curb of corners and allowing their car to partially leave the road. The user-specific data based on the received user input 416 may be compared to the predicted input from the generalized ML model and the generalized ML model may be refined to provide ML inputs 422 that more accurately predict the inputs of the particular user in the event of user inputs 416 being lost or delayed by network irregularities.

In some implementations, a ML node 418 provides benefits to the video information output by the game server 406. For example, the game server 406 may output a first video information 408-1 that is received and processed by the ML node 418. The ML node 418 may apply one or more post-processing operations to the first video information 408-1 to create a second video information 408-2 that is transmitted to the distribution node 410 for distribution to a client device 402. In some implementations, the post-processing includes resolution up-scaling, such as upscaling from native 1080p resolutions to 4K resolutions. In some implementations, the post-processing includes framerate interpolation, such as interpolating 60 frames per second to 120 frames per second. In some implementations, the post-processing includes improvement to the dynamic range of the video information 408-1, such as changes from standard dynamic range (SDR) to high dynamic range (HDR). In some implementations, the post-processing includes additional shading and/or anti-aliasing of the video information 408-1.

In some implementations, additional information can be added to and/or improved by the ML node 418. For example, the ML node 418 may use the video information 408-1 and/or the game state data 420 to determine haptic information, such as rumble feedback or adaptive resistance in an input device, that may be transmitted to the client device for presentation to a user through an input device. In at least one example, a legacy or backward compatible game application may not support all types of haptic feedback available to the user on input device(s) of the client device 402. The ML node 418 may analyze the information 408-1 and/or the game state data 420 to determine haptic information and add that haptic information to the second video information 408-2 or other information to be distributed to the client device 402.

In some implementations, audio information may be improved or added for distribution to the client device 402. For example, a game application may not support surround sound or 3D audio natively in the game application. The ML node 418 may analyze the game state data 420 and determine or add directionality of audio sources to simulate surround sound or 3D audio at the client device 402.

While the post-processing operations (video, audio, haptic, etc.) and ML input calculations are described in relation to the ML node 418 being discrete from the distribution node 410, in some implementations, the ML node 418 is integrated into the distribution node 410. In at least one example, the ML model and the video encoding may both be performed at the distribution node 410 before the encoded video information 412 (and, optionally, audio information or haptic information) is distributed to the client device 402 and/or the inputs (user inputs 416 and/or ML inputs 422) are transmitted to the game server 406.

Figure 5:
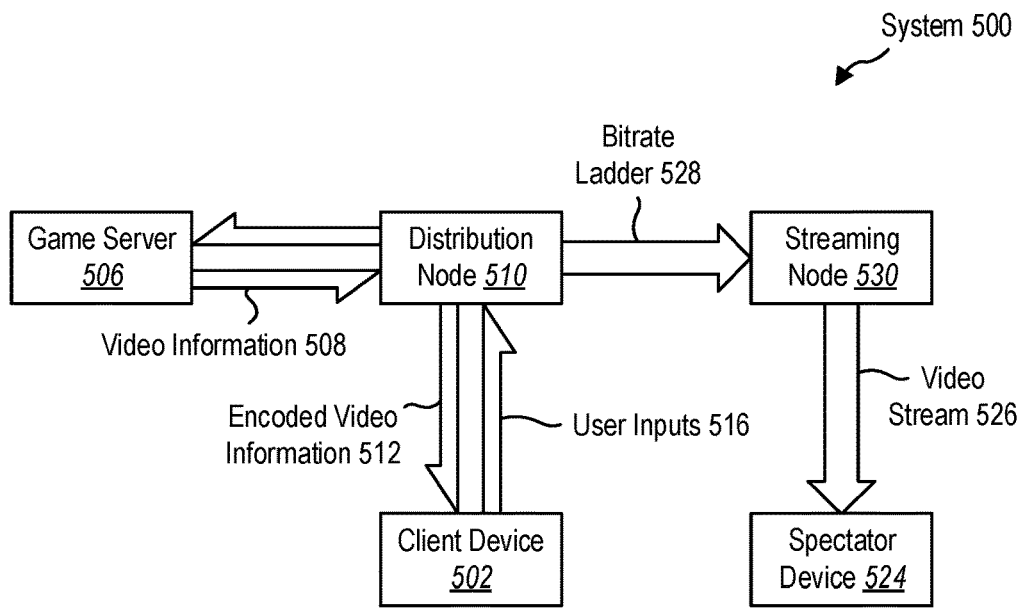
FIG. 5 is a schematic representation of a streaming system for interactive game applications with spectating of a video stream, according to at least some implementations of the present disclosure.

FIG. 5 is a schematic representation of a system 500 according to the present disclosure that allows a viewing user at a spectator device 524 to view a video stream 526 (i.e., non-interactive viewing) of the game instance played by a playing user at a client device 502. The game server 506 executes the game application to create a game instance, at least the video information 508 of which is provided to the distribution node 510 for encoding. The encoded video information 512 is encoded based on the network connection specifically with the client device 502. Additionally, the video information is encoded at a plurality of bitrates in a bitrate ladder 528 and provided to a streaming node 530.

Bitrate is a measure of bandwidth consumed by the video stream 526. The bitrate is affected by the resolution, the frames per second, the color depth, the dynamic range, etc. By providing encoding the video stream 526 at a plurality of bitrates, an adaptive bitrate ladder can provide the best quality video stream 526 to a spectator device 524 based on the connection quality (i.e., speed) between the spectator device 524 and the streaming node 530. While the streaming node 530 is illustrated as a discrete component of the system 500, it should be understood that, in some implementations, the distribution node 510 is integrated with the streaming node 530, and the distribution node 510 distributes both the encoded video information 512 to the client device 502 for interactive play with the game application, as well as the video stream 526 with an adaptive bitrate ladder to the spectator device 524.

In some implementations, the streaming node 530 provides one or more social features to the spectator device 524 in addition to the video stream 526. For example, while the spectating device 524 cannot interact with the game instance to which the client device 502 is interactively connected, the streaming node 530 may provide a text or voice chat function for a viewing user at the spectator device 524 to communicate with the playing user at the client device 502. In some examples, a plurality of spectator devices 524 are viewing the video stream 526 from the streaming node 530, and the streaming node 530 allows the spectator devices 524 to communicate with one another.

Figure 6:
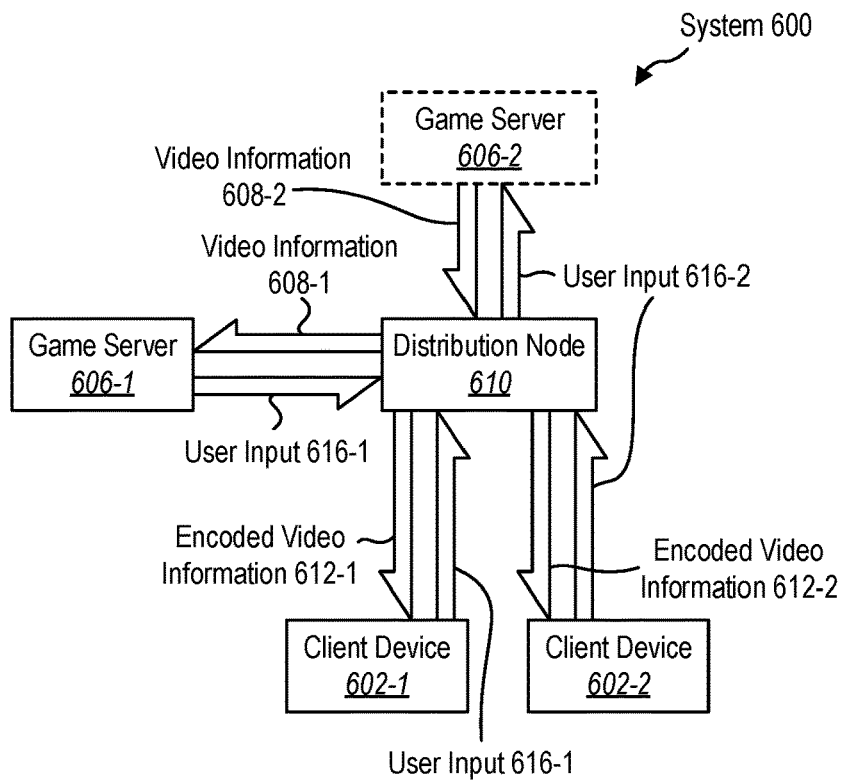
FIG. 6 is a schematic representation of a streaming system for interactive game applications to a plurality of client device, according to at least some implementations of the present disclosure.

A system 600 according to the present disclosure allows for multiple client devices 602-1, 602-2 to connect to a single distribution node 610, such as illustrated in the implementation of FIG. 6. While two client devices 602-1, 602-2 are illustrated in the implementation of FIG. 6, it should be understood that any number of client devices may be connected to the distribution node 610. In some implementations, a first client device 602-1 and a second client device 602-2 are connected to the same distribution node to allow both client devices 602-1, 602-2 to receive video information from a first game server 606-1 and send user inputs 616-1, 616-2 to the first game server 606-1. For example, the first client device 602-1 and second client device 602-2 can play a single instance of a game application together, either cooperatively or competitively, depending on the game application. In such an implementation, the first client device 602-1 and second client device 602-2 each receive the same encoded video information 612-1, 612-2 from the distribution node 610, such that both players see the same frames from the first game server 606-1 as if the players were playing "couch co-op" and both of the first user input 616-1 and second user input 616-2 affect the shared game instance. A shared game instance is a single game instance of a game application executed by the game server, and a plurality of client devices are connected to the shared game instance. Each client device of the plurality of client devices is able to interact with the game instance on the game server, and each client device of the plurality of client devices receives the same video information related to the shared game instance.

In some implementations, the first client device 602-1 and second client device 602-2 receive the same video information (i.e., see the same frames and/or images provided from the game server) but the distribution node 610 encodes the video information differently. For example, the video information may be encoded at the distribution node 610 based on the different network connections of each of the client devices 602-1, 602-2. While the video information 608 is the same, the distribution node 610 may distribute a first encoded video information 612-1 to the first client device 602-1 based on the particular network connection of the first client device 602-1 with the distribution node 610 and distribute a second encoded video information 612-2 to the second client device 602-2 based on the particular network connection of the second client device 602-2 with the distribution node 610.

In some implementations, the first client device 602-1 and second client device 602-2 are connected to the same distribution node 610, but the distribution node 610 is connected to both a first game server 606-1 and a second game server 606-2. While two game servers 606-1, 606-2 are illustrated in the implementation of FIG. 6, it should be understood that any number of game servers may be connected to the distribution node 610. In some examples, a distribution node may be connected to an equal number of game servers and client devices. In some examples, a distribution node may be connected to more client devices than game servers, such as two client devices connected to a first game server and a third client device connected to a second game server.

The distribution node provides a connection between the first game server 606-1 and the first client device 602-1 and a connection between the second game server 606-2 and the second client device 602-2. In some implementations, the first user inputs 616-1 from the first client device 602-1 are transmitted from the distribution node 610 to the first game server 606-1 and the second user inputs 616-2 from the second client device 602-2 are transmitted from the distribution node 610 to the second game server 606-2. A first video information 608-1 relating to a first game instance of the first game application is transmitted from the first game server 606-1 to the distribution node 610, and second video information 608-2 relating to a second game instance of the first game application or a second game application is transmitted from the second game server 606-2 to the distribution node 610.

In some implementations, the first video information 608-1 and second video information 608-2 are received by the distribution node 610 and encoded into a multiple game instance stream that is provided in both of the encoded video information 612-1, 612-2. The multiple game instance stream may include video information from game servers 606-1, 606-2 that are running the same game application. For example, the multiple game instance stream can be a split-screen or picture-in-picture view including the first video information 608-1 of a first game instance of Minecraft running on the first game server 606-1 and the second video information 608-2 of a second game instance of Minecraft running on the second game server 606-2. In another example, the multiple game instance stream can be a split-screen or picture-in-picture view including the first video information 608-1 of a first game instance of Forza Horizon running on the first game server 606-1 and the second video information 608-2 of a second game instance of Minecraft running on the second game server 606-2. In each case, both client devices 602-1 602-2 display video content for both game instances, even though the instances are different. In at least one example, the streaming node described in relation to FIG. 5 (e.g., streaming node 530) can stream the multiple game instance stream to spectator devices, allowing spectators to watch two players playing different game instances, such as during a speedrunning competition.

In some implementations, the encoded video information 612-1, 612-2 provided to the client devices 602-1, 602-2 may include video information from each of the first game server 606-1 and the second game server 606-2 with a different proportion of the display being occupied by the video information from the game server to which the respective client device is connected. For example, both client devices 602-1, 602-2 may receive encoded video information 612-1, 612-2 including video information from both game servers, but the first client device 602-1 displays to a first user a fullscreen display of the video information from the first game server 606-1 with the video information from the second game server 606-2 in a picture-in-picture frame in the corner of the display of the first client device 602-1. Conversely, the second client device 602-2 displays to a second user a fullscreen display of the video information from the second game server 606-2 with the video information from the first game server 606-1 in a picture-in-picture frame in the corner of the display of the second client device 602-2.

Figure 7:
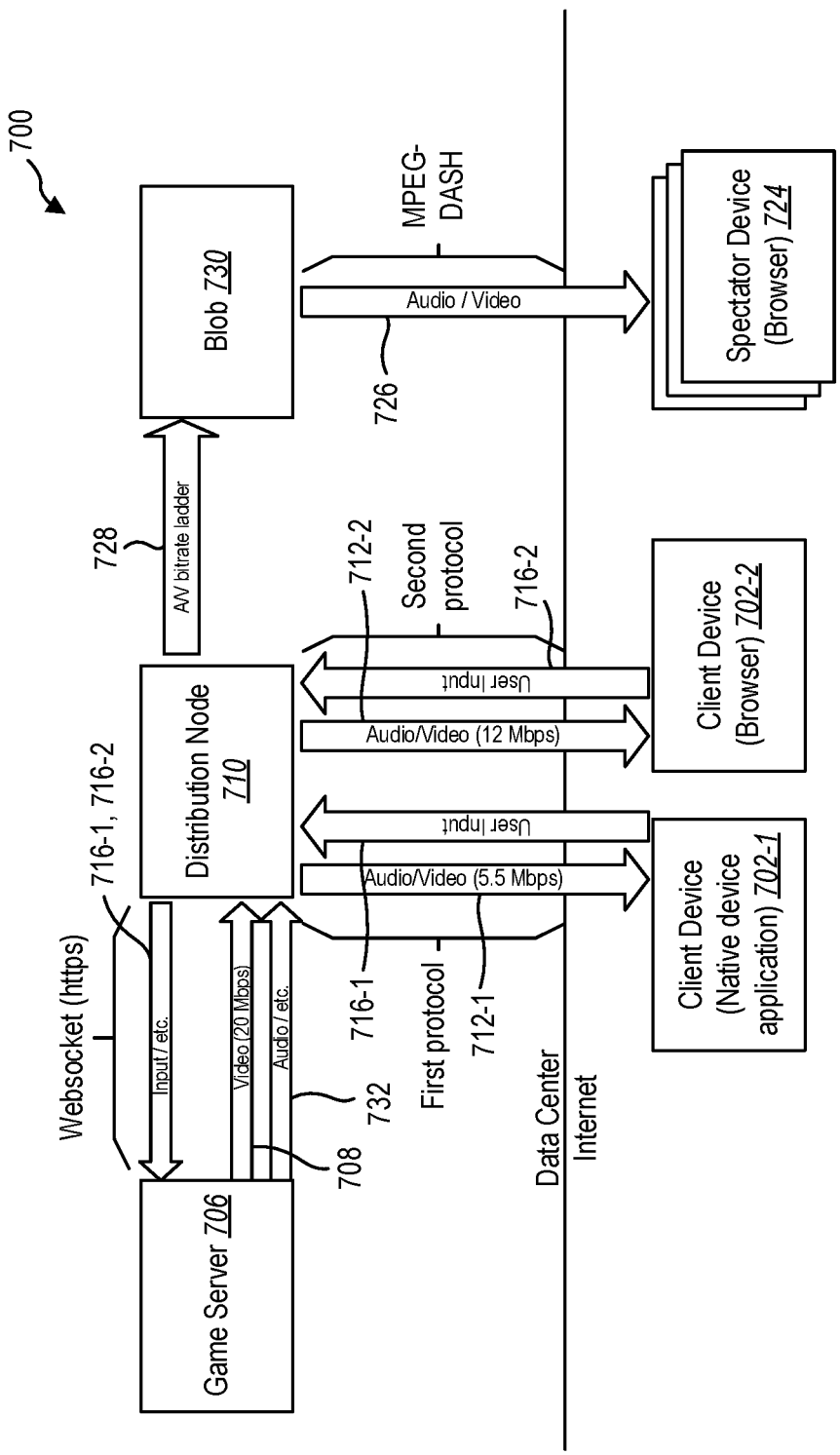
FIG. 7 is a schematic representation of a particular implementation of a streaming system for interactive game applications.

FIG. 7 is a schematic illustration of a specific implementation of a system 700 according to the present disclosure. The system 700 includes a plurality of client devices 702-1, 702-2 communicating with a single game server 706 via a distribution node 710. The distribution node 710 also provides a bitrate ladder 728 to a streaming node 730, with which a plurality of spectator devices 724 are connected to view the video stream 726 of the game instance being played by the users of the client devices 702-1, 702-2.

In some implementations, the system 700 uses more than one communication protocol to communicate between devices. In some implementations, the data connection between the game server 706 and the distribution node 710 shares a protocol. For example, in the illustrated implementation, the game server 706 and distribution node 710 use a WebSocket (HTTPS) protocol to transmit user inputs 716-1, 716-2 to the game server 706 and video information 708 and audio information 732 to the distribution node 710.

In some implementations, each of the data connections between a client device 702-1, 702-2 and the distribution node 710 shares a protocol. For example, in the illustrated implementation, the first client device 702-1 and the distribution node 710 use a first protocol to transmit user inputs 716-1 to the distribution node 710 and encoded video information 712-1 with audio information to the first client device 702-1. In another example, in the illustrated implementation, the second client device 702-2 and the distribution node 710 use a second protocol to transmit user inputs 716-2 to the distribution node 710 and encoded video information 712-2 with audio information to the second client device 702-2.

In some implementations, the client devices 702-1, 702-2 are the same. For example, both client devices may be a general-purpose computer with an internet browser for communicating with the distribution node 710. In some implementations, the client devices 702-1, 702-2 are different from one another. In an example, a first client device 702-1 is a native application for communicating with the distribution node 710 running on a specialized computing device, such as an Android smartphone, and a second client device is a general-purpose computer with an internet browser for communicating with the distribution node 710. The protocols used to communicate between the client devices 702-1, 702-2 and the distribution node 710 may be the same or different, irrespectively of the type of client devices.

In some implementations, a system according to the present disclosure allows a game server to allocate more computing resources to running a game application, while communication, encoding, ML models, post-processing, or combinations thereof are offloaded to a distribution node and/or ML node of the system. Dedicating nodes to the communication, encoding, ML models, post-processing, or combinations thereof allows for greater modularity, flexibility, and ease of repair.

INDUSTRIAL APPLICABILITY

The present disclosure relates generally to systems and methods for allowing a remote user at a client device to play a game application on a game server. The game server executes the game application and transmits at least video information to a distribution node. In some implementations, the distribution node encodes the video information (to create encoded video information) from the game server for distribution over a network to the client device. In some implementations, the network is the World Wide Web. In some implementations, the network is a local area network. In some implementations, the network is a wide area network. In some implementations, the network is the World Wide Web, and the client device may be anywhere in the world relative to the game server.

The client device received the encoded video information from the distribution node and displays to a user a video feed of a game instance of the game application that is executed by the game server. The user may then provide one or more user inputs to the client device to interact with the game instance of the game application. The user inputs are transmitted to and received by the game server. The game server interprets the user inputs to allow the user to interact with the game application.

In some implementations, the game server is local to and directly connected to the distribution node. For example, the game server may be in the same datacenter as the distribution node. In some examples, the game server and distribution node may be in the same server rack in a datacenter. In some implementations, the game server is located remotely relative to the distribution node. For example, the game server may be located in a first datacenter and the distribution node may be located in a second datacenter connected to the first datacenter via a network.

As described herein, the game server may be a general-purpose computing device or a specialized computing device, such as a retail commodity hardware video game console. In either case, the game server includes a processor(s), such as central processing unit, graphical processing unit, physics processing unit, or other processors; a hardware storage device; and a video output device. The hardware storage device has instructions stored thereon that, when executed by the processor(s) of the game server, cause the game server to execute a game application and render a game instance of the game application.

In some implementations, the hardware storage device is any non-transient computer readable medium that may store instructions thereon. The hardware storage device may be any type of solid-state memory; volatile memory, such as static random access memory (SRAM) or dynamic random access memory (DRAM); or non-volatile memory, such as read-only memory (ROM) including programmable ROM (PROM), erasable PROM (ERPOM) or EEPROM; magnetic storage media, such as magnetic tape; platen-based storage device, such as hard disk drives; optical media, such as compact discs (CD), digital video discs (DVD), Blu-ray Discs, or other optical media; removable media such as USB drives; non-removable media such as internal SATA or non-volatile memory express (NVMe) style NAND flash memory, or any other non-transient storage media. In some implementations, the hardware storage device is local to and/or integrated with the computing device. In some implementations, the hardware storage device is accessed by the computing device through a network connection.

The video information rendered by the game server is provided, such as by the video output device, to the distribution node. In some implementations, the distribution node includes at least a processor(s), a hardware storage device, a video connection device, and a network connection device. The hardware storage device of the distribution node has instructions stored thereon that, when executed by the processor(s) of the distribution node, cause the distribution node to execute any of the methods described herein.

In some implementations, a method of providing allowing a remote user at a client device to play a game application on a game server is performed at the distribution node and includes receiving video information from a game server, encoding the video information into encoded video information, distributing the encoded video information to a client device, receiving a user input from the client device, and transmitting the user input to the game server. Other implementations and variations of methods are described herein in relation to the implementations of game streaming systems.

The video connection device receives the video information from the game server. In some implementations, the video connection device is a physical piece of hardware, such as an HDMI-In port, or a logical software component, such as software to receive video information through a more generalized data connection, such as USB, Ethernet, wireless antenna, optical, etc. In some implementations, the game server provides additional game instance information, such as audio information, haptic information, game state data, or other information, and the distribution node is configured to receive such additional information and distribute that information in addition to the video information. The processors may encode the video information to create encoded video information, and the network connection device of the distribution node may distribute the encoded video information to the client device via the network.

The client device is any electronic device with network connectivity to receive and transmit information to a remotely located game server and/or distribution node. In particular examples, client devices include personal electronic devices, such as smartphones, tablet computers, desktop computers, laptop computers, hybrid computers, wearable electronic devices; television; automotive infotainment system; household appliance, or any other networked electronic device. In some implementations, the client device displays video information relating to a game instance from a game server, and the client device transmits user inputs to the game server to interact with the game application. In some implementations, the client device is a general-purpose computing device with an internet browser-based connection to the distribution node and/or game server. In some implementations, the client device executes a native application to connect to the distribution node and/or game server.

A user input, according to the present disclosure, should be understood to include any signal or input by any input mechanism that provides instructions to the game server to interact with and/or affect the game application. In some implementations, the user input may be provided through a human interface device (HID) of the client device, such as a keyboard, touchpad, or mouse, or through a dedicated gamepad controller or other peripheral primarily used for playing video games.

In some implementations, relaying user inputs through the distribution node introduces input lag to the system, compromising the responsiveness of the game application to the user inputs provided by the user at the client device. Other implementations of a system according to the present disclosure allow for user inputs to be routed directly to the game server. Direct communication of the user inputs between the client device and the game server may reduce latency in the communication between the user providing the user inputs at the client device and the user inputs being received and processed by the game server.

Additional processes may be used to further reduce perceived latency for the user through the use of ML models performed at the distribution node and/or on an additional node. In some implementations, a system according to the present disclosure can include a ML model that receives game state data from the game server and uses the game state data to provide additional inputs to the game server to complement the user inputs.

Game state data includes any information that may allow a second electronic device to recreate a given game state. For example, the game state data of a first game instance running on a first electronic device may be provided to second copy of a game application running on a second electronic device, and the second electronic device may render a duplicate of the first game instance based on the game state data. In some implementations, game state data includes virtual object or avatar positions, movement, player character statistics or characteristics, player character inventory, player character status, ability cooldown status, non-player character status, or any other information about the game state of the first instance. In some implementations, the game state data is used to synchronize two instances of a game application to render the same game environment to two different players. In some implementations, the game state data is used to present the game state of the first instance asynchronously to a second instance to allow the same or different player to experience the game state of the first instance at a later time.

In some implementations, the game state data is provided to a ML model, such as that used by the ML node, and the ML model can identify the current status or situation of the game application. For example, the ML model may receive game state data that includes data regarding the game application, the game instance, the player character, and the game environment, which allows the ML model to make predictions about what the user may intend to do next in the game. In a particular example, the ML model may identify that the game application is a driving game, and the user is racing against computer-controlled avatars. Due to latency in the network connection, the user inputs 316 may be delayed from the client device or packets of video information may be delayed en route to the client device that compromise the user's ability to react to the current game state. The ML model may identify the current game state from the game state data and anticipate that the user will steer their car to follow the road. The ML node may provide ML inputs to supplement the user inputs that help steer the user's car in the absence or delay of user inputs.

The distribution node receives, in some implementations, both the user input from the client device and the ML input from the ML node. The distribution node, in some implementations, merges the user inputs with the ML inputs and transmits both the user inputs and the ML inputs to the game server. In some examples, the predicted ML input and the actual user input are the same, and merging the inputs has no noticeable effect. In other examples, the user input is absent at the distribution node due to latency and/or network packet drops, and the ML input may fill in the gaps in the user inputs with the predicted inputs. In a particular example, the user provides a continuous right directional input to steer the car to the right around a corner. The ML input predicts a right input for the corner and predicts that a user input will continue to be a right directional input throughout the corner in the game environment. If a network connection issue causes a break in the user input, the distribution node may use the ML input to supplement the user input to transmit a continuous right-direction input to the game server.

In yet other examples, the distribution node receives different user input and a ML input. In such examples, the distribution node may prioritize the transmission of the user input and ignore the ML input, whereby the game server receives the user input as the user would expect. For example, while the ML model may predict that user steer to the right to follow the corner of the previous example, a user may instead continue in a straight line to pursue a shortcut or intentionally drive off the road.

In some implementations, the ML model may receive the user inputs from the client device and/or the distribution node to refine the ML model. For example, a system where the ML node is located between the game server and the distribution node may modify and/or supplement data transmitted between the game server and the distribution node.

In some examples, the ML node may receive game state data, as described herein, to recreate the game environment of the game instance running on the game server. In some implementations, the ML node also receives user inputs from the client device. In some examples, the user inputs are received through the distribution node, while in other examples, the user inputs are received directly from the client device (without traveling through the distribution node) to reduce latency. The ML node can use a ML model to evaluate the game instance represented by the game state data and compare a predicted ML input to the received user input. In some implementations, the ML node transmits to the game server the user input and/or the ML input based on the comparison of the user input and the ML input.

In some implementations, the ML node refines the ML model based on a comparison of the ML input and the user input. In the driving game example described herein, the ML input supplemented the user input to predict that the user would steer to remain on the road based on aggregated community statistics. In other words, most players that race on that track follow the road. In some implementations, the ML model may be refined using user-specific data to customize the ML inputs to predict what that particular user may input. For example, a particular user may be aggressive at cutting the inside curb of corners and allowing their car to partially leave the road. The user-specific data based on the received user input may be compared to the predicted input from the generalized ML model and the generalized ML model may be refined to provide ML inputs that more accurately predict the inputs of the particular user in the event of user inputs being lost or delayed by network irregularities.

In some implementations, a ML node provides benefits to the video information output by the game server. For example, the game server may output a first video information that is received and processed by the ML node. The ML node may apply one or more post-processing operations to the first video information to create a second video information that is transmitted to the distribution node for distribution to a client device. In some implementations, the post-processing includes resolution up-scaling, such as upscaling from native 1080p resolutions to 4K resolutions. In some implementations, the post-processing includes framerate interpolation, such as interpolating 60 frames per second to 120 frames per second. In some implementations, the post-processing includes improvement to the dynamic range of the video information, such as changes from standard dynamic range (SDR) to high dynamic range (HDR). In some implementations, the post-processing includes additional shading and/or anti-aliasing of the video information.

In some implementations, additional information can be added to and/or improved by the ML node. For example, the ML node may use the video information and/or the game state data to determine haptic information, such as rumble feedback or adaptive resistance in an input device, that may be transmitted to the client device for presentation to a user through an input device. In at least one example, a legacy or backward compatible game application may not support all types of haptic feedback available to the user on input device(s) of the client device. The ML node may analyze the information and/or the game state data to determine haptic information and add that haptic information to the second video information or other information to be distributed to the client device.

In some implementations, audio information may be improved or added for distribution to the client device. For example, a game application may not support surround sound or 3D audio natively in the game application. The ML node may analyze the game state data and determine or add directionality of audio sources to simulate surround sound or 3D audio at the client device.

While the post-processing operations (video, audio, haptic, etc.) and ML input calculations are described in relation to the ML node being discrete from the distribution node, in some implementations, the ML node is integrated into the distribution node. In at least one example, the ML model and the video encoding may both be performed at the distribution node before the encoded video information (and, optionally, audio information or haptic information) is distributed to the client device and/or the inputs (user inputs and/or ML inputs) are transmitted to the game server.

In at least some implementations, a system allows a viewing user at a spectator device to view a video stream (i.e., non-interactive viewing) of the game instance played by a playing user at a client device. The game server executes the game application to create a game instance, at least the video information of which is provided to the distribution node for encoding. The encoded video information is encoded based on the network connection specifically with the client device and is distributed to the client device. Additionally, the video information is encoded at a plurality of bitrates in a bitrate ladder and provided to a streaming node.

Bitrate is a measure of bandwidth consumed by the video stream. The bitrate is affected by the resolution, the frames per second, the color depth, the dynamic range, etc. By providing encoding the video stream at a plurality of bitrates, an adaptive bitrate ladder can provide the best quality video stream to a spectator device based on the connection quality (i.e., speed) between the spectator device and the streaming node. While the streaming node is illustrated as a discrete component of the system, it should be understood that, in some implementations, the distribution node is integrated with the streaming node, and the distribution node distributes both the encoded video information to the client device for interactive play with the game application, as well as the video stream with an adaptive bitrate ladder to the spectator device.

In some implementations, the streaming node provides one or more social features to the spectator device in addition to the video stream. For example, while the spectating device cannot interact with the game instance to which the client device is interactively connected, the streaming node may provide a text or voice chat function for a viewing user at the spectator device to communicate with the playing user at the client device. In some examples, a plurality of spectator devices views the video stream from the streaming node, and the streaming node allows the spectator devices to communicate with one another.

A system according to the present disclosure allows for multiple client devices to connect to a single distribution node. In some implementations, a first client device and a second client device are connected to the same distribution node to allow both client devices to receive video information from a first game server and send user inputs to the first game server. For example, the first client device and second client device can play a single instance of a game application together, either cooperatively or competitively, depending on the game application. In such an implementation, the first client device and second client device each receive the same encoded video information from the distribution node, such that both players see the same frames from the first game server as if the players were playing "couch co-op" and both of the first user input and second user input affect the shared game instance. A shared game instance is a single game instance of a game application executed by the game server, and a plurality of client devices are connected to the shared game instance. Each client device of the plurality of client devices is able to interact with the game instance on the game server, and each client device of the plurality of client devices receives the same video information related to the shared game instance.

In some implementations, the first client device and second client device receive the same video information (i.e., see the same frames and/or images provided from the game server) but the distribution node encodes the video information differently. For example, the video information may be encoded at the distribution node based on the different network connections of each of the client devices. While the video information is the same, the distribution node may distribute a first encoded video information to the first client device based on the particular network connection of the first client device with the distribution node and distribute a second encoded video information to the second client device based on the particular network connection of the second client device with the distribution node.

In some implementations, the first client device and second client device are connected to the same distribution node, but the distribution node is connected to both a first game server and a second game server. The distribution node provides a connection between the first game server and the first client device and a connection between the second game server and the second client device. In some implementations, the first user inputs from the first client device are transmitted from the distribution node to the first game server and the second user inputs from the second client device are transmitted from the distribution node to the second game server. A first video information relating to a first game instance of the first game application is transmitted from the first game server to the distribution node, and second video information relating to a second game instance of the first game application or a second game application is transmitted from the second game server to the distribution node.

In some implementations, the first video information and second video information are received by the distribution node and encoded into a multiple game instance stream that is provided in both of the encoded video information. The multiple game instance stream may include video information from game servers that are running the same game application. For example, the multiple game instance stream can be a split-screen or picture-in-picture view including the first video information of a first game instance of Minecraft running on the first game server and the second video information of a second game instance of Minecraft running on the second game server. In another example, the multiple game instance stream can be a split-screen or picture-in-picture view including the first video information of a first game instance of Forza Horizon running on the first game server and the second video information of a second game instance of Minecraft running on the second game server. In each case, both client devices display video content for both game instances, even though the instances are different. In at least one example, the streaming node can stream the multiple game instance stream to spectator devices, allowing spectators to watch two players playing different game instances, such as during a speedrunning competition.

In some implementations, the encoded video information provided to the client devices may include video information from each of the first game server and the second game server with a different proportion of the display being occupied by the video information from the game server to which the respective client device is connected. For example, both client devices may receive encoded video information including video information from both game servers, but the first client device displays to a first user a fullscreen display of the video information from the first game server with the video information from the second game server in a picture-in-picture frame in the corner of the display of the first client device. Conversely, the second client device displays to a second user a fullscreen display of the video information from the second game server with the video information from the first game server in a picture-in-picture frame in the corner of the display of the second client device.

The present disclosure relates to systems and methods for allowing remote play of a game application to a user on a client device according to at least the examples provided in the sections below:

(A1) In some implementations, a distribution node for allowing interaction with interactive applications to a remote user includes a video connection device, a network connection device, a processor, and a hardware storage device. The video connection device is configured to connect to a game server and receive at least video information from the game server. The network connection device is configured to connect to a network. The hardware storage device has instructions stored that, when executed by the processor, cause the distribution node to encode the video information from the game server to encoded video information and distribute the encoded video information over the network to a client device.

(A2) In some implementations, the distribution node of (A1) can receive user inputs from the client device and transmit those user inputs to the game server to allow a user at the client device to interact with a game application running on the game server.

(A3) In some implementations, the distribution node of (A1) can encode the video information to a video stream for distribution to a spectator device. The video stream may be encoded in a bitrate ladder to facilitate transmission at different bitrates depending on network conditions.

(A4) In some implementations, the distribution node of (A1) can perform one or more machine learning models based upon user inputs to provide ML inputs to the game server.

(A5) In some implementations, the distribution node of (A1) can perform one or more post-processing operations on the video information to improve the visual fidelity or appearance.

(A6) In some implementations, a system for allowing interaction with game applications to a remote user includes a game server and a distribution node. The game server is configured to run a game application and generate at least video information. The distribution node is connected to the game server and configured to receive the video information and encode the video information for distribution via a network.

(A7) In some implementations, the system of (A6) includes a first client device in data communication with the distribution node. (A8) The system of (A7) can include a second client device in data communication with the distribution node. (A9) The first client device can be in data communication with the game server and the second device can be in data communication with the game server such that a first user input of the first client device and a second user input of the second client device are transmitted to the game server to interact with a shared instance of the game application. The system of (A9) can, thereby, allow couch co-op for players on different client devices.

(A10) In some implementations, the system of (A8) includes a second game server in data communication with the distribution node so that the second client device is in data communication with the second game server through the distribution node. A first user input of the first client device is transmitted to the first game server and a second user input of the second client device is transmitted to the second game server.

(A11) In some implementations, the distribution node of (A8) distributes a multiple instance video stream to the first client device and the second client device that includes video information from both the first game server and the second game server.

(A12) In some implementations, a method of providing interaction with a game instance of a game application by a remote user includes, at a distribution node, receiving video information from a game server, encoding the video information into encoded video information, distributing the encoded video information to a client device, receiving a user input from the client device, and transmitting the user input to the game server.

(A13) The distribution node and the game server may share a communication protocol.

(A14) The distribution node and the client device may share a communication protocol.

(A15) The method of (A12) may include generating a video stream with a bitrate ladder and making the video stream available for streaming.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one implementation" or "an implementation" of the present disclosure are not intended to be interpreted as excluding the existence of additional implementations that also incorporate the recited features. For example, any element described in relation to an implementation herein may be combinable with any element of any other implementation described herein. Numbers, percentages, ratios, or other values stated herein are intended to include that value, and also other values that are "about" or "approximately" the stated value, as would be appreciated by one of ordinary skill in the art encompassed by implementations of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the scope of the present disclosure, and that various changes, substitutions, and alterations may be made to implementations disclosed herein without departing from the scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the implementations that falls within the meaning and scope of the claims is to be embraced by the claims.

It should be understood that any directions or reference frames in the preceding description are merely relative directions or movements. For example, any references to "front" and "back" or "top" and "bottom" or "left" and "right" are merely descriptive of the relative position or movement of the related elements.

The present disclosure may be embodied in other specific forms without departing from its characteristics. The described implementations are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A system for allowing interaction with game applications to a remote user, the system comprising:
a game server configured to run a game application and generate at least a first video information;
a machine learning (ML) node including a trained ML model trained on training inputs including at least one of a prior video information and prior user input, the ML node connected to the game server and configured to:
receive the first video information;
identify a current game state from the first video information;
generate additional information based on the current game state and the first video information, wherein the additional information is supported by the remote user and is not supported by the game application; and create a second video information, wherein the second video information includes the first video information and the additional information; and a distribution node connected to the game server and the ML node and configured to receive the second video information and encode the second video information to encoded second video information for distribution via a network, wherein the encoding used by the distribution node is selected based on a particular network connection established between the distribution node and the remote user.

2. The system of claim 1, further comprising a first client device in data communication with the distribution node.

3. The system of claim 2, further comprising a second client device in data communication with the distribution node.

4. The system of claim 3, wherein the first client device is in data communication with the game server and the second client device is in data communication with the game server such that a first user input of the first client device and a second user input of the second client device are transmitted to the game server to interact with a shared instance of the game application.

5. The system of claim 3, wherein the game server is a first game server and further comprising a second game server in data communication with the distribution node, and
wherein the first client device is in data communication with the first game server and the second client device is in data communication with the second game server such that a first user input of the first client device is transmitted to the first game server and a second user input of the second client device is transmitted to the second game server.

6. The system of claim 5, wherein the distribution node distributes a multiple instance video stream to the first client device and the second client device.

7. The system of claim 1, wherein the first video information is encoded at the game server and the distribution node encodes the second video information with a different codec.

8. A method of providing video information of a game instance of a game application to a remote user, the method comprising:
at a machine learning (ML) node, wherein the ML node includes a trained ML model trained on training inputs including at least one of a prior video information and prior user input:
receiving first video information from a game server; and
generating second video information based on supplementing the first video information with additional information generated by a ML model, wherein the additional information is supported by a client device of the remote user and is not supported by the game application; and
at a distribution node:
receiving the second video information from the ML node;
encoding the second video information into encoded video information; and
distributing the encoded video information to the client device.

9. The method of claim 8, wherein supplementing the first video information includes adding haptic information corresponding to the first video information.

10. The method of claim 9, wherein a haptic feedback is not supported by the game application but is supported by an input device of the remote user.

11. The method of claim 9, wherein the haptic information includes rumble feedback and/or adaptive resistance for presentation to the remote user through an input device.

12. The method of claim 8, wherein supplementing the first video information includes adding audio information corresponding to the first video information.

13. The method of claim 12, wherein the audio information is not supported by the game application but is supported by the client device.

14. The method of claim 12, wherein the audio information includes one or more of surround sound, 3D, and directional audio.

15. The method of claim 8, wherein supplementing the first video information includes one or more of resolution upscaling, framerate interpolation, improving a dynamic range, and shading and/or anti-aliasing of the first video information.

16. The method of claim 8, comprising:
at the machine learning (ML) node including the trained ML model trained on training inputs including at least one of a prior video information and prior user input:
wherein the first video information includes game state data from the game server;
identifying a current game state from the game state data; and
generating a machine learning (ML) input based on the current game state wherein the ML input predicts next inputs for the remote user; and
at the distribution node:
receiving a user input from the client device;
receiving the ML input from the ML node to supplement the user input; and
transmitting the user input and the ML input to the game server.

17. The method of claim 16, wherein the distribution node and the game server share a protocol.

18. The method of claim 16, wherein the client device and the distribution node share a protocol.

19. The method of claim 16, further comprising generating a video stream with a bitrate ladder; and
making the video stream available for streaming to at least one spectator device.

20. The method of claim 16, further comprising performing at least one post-processing operation on the video information before encoding the video information.

21. A method of providing interaction with a game instance of a game application by a remote user, the method comprising:
at a machine learning (ML) node:
receiving game state data from a game server;
identifying a current game state from the game state data; and
generating a machine learning (ML) input that anticipates next inputs for a remote user based on the current game state; and
at a distribution node:
receiving video information from a game server;
encoding the video information into encoded video information;
distributing the encoded video information to a client device;
receiving a user input from the client device;
receive the ML input from the ML node to supplement the user input; and
transmitting the user input and the ML input to the game server.

* * * * *